(12) United States Patent
Geo

(10) Patent No.: US 10,141,694 B2
(45) Date of Patent: Nov. 27, 2018

(54) USER AUTHENTICATING ELECTRICAL OUTLET OR CONNECTOR, POWER MEDIATING MODULE, AND POWER CONSUMING DEVICE

(71) Applicant: GEO-LINE CO., LTD., Ansan, Gyeonggi-do (KR)

(72) Inventor: Sung Gyoo Geo, Seoul (KR)

(73) Assignee: GEO-LINE CO., LTD., Ansan, Gyeonggi-do (KR)

( * ) Notice: Subject to any disclaimer, the term of this patent is extended or adjusted under 35 U.S.C. 154(b) by 0 days.

(21) Appl. No.: 15/548,683

(22) PCT Filed: Feb. 3, 2016

(86) PCT No.: PCT/KR2016/001203
§ 371 (c)(1),
(2) Date: Aug. 3, 2017

(87) PCT Pub. No.: WO2016/126112
PCT Pub. Date: Aug. 11, 2016

(65) Prior Publication Data
US 2018/0026404 A1    Jan. 25, 2018

(30) Foreign Application Priority Data

Feb. 3, 2015   (KR) .......................... 10-2015-0016941

(51) Int. Cl.
*H01R 13/703*        (2006.01)
*H01R 13/66*         (2006.01)
(Continued)

(52) U.S. Cl.
CPC ......... *H01R 13/7037* (2013.01); *H01R 13/66* (2013.01); *H01R 13/713* (2013.01);
(Continued)

(58) Field of Classification Search
CPC ... H01R 13/7038; H04W 12/06; H04W 12/08
(Continued)

(56) References Cited

U.S. PATENT DOCUMENTS

| 8,918,376 B2* | 12/2014 | Ambrosio ........... B60L 11/1824 |
| | | 707/694 |
| 9,184,616 B2* | 11/2015 | Choi ....................... H02J 7/007 |
| 9,769,741 B2* | 9/2017 | Choi ....................... H04B 1/401 |

FOREIGN PATENT DOCUMENTS

| JP | 2006-262570 A | 9/2006 |
| KR | 10-2009-0125560 A | 12/2009 |

(Continued)

OTHER PUBLICATIONS

International Search Report for International Application No. PCT/KR2016/001203, dated May 16, 2016, 2 pages.

*Primary Examiner* — Harshad C Patel
(74) *Attorney, Agent, or Firm* — Mintz Levin Cohn Ferris Glovsky and Popeo, P.C.; Kongsik Kim; Jhongwoo Jay Peck

(57) ABSTRACT

Provided are a user authenticating electrical outlet or connector by which there is no standby power consumption, a power mediating module for receiving power from the electrical outlet or connector and supplying the same to a power consuming device, and the power consuming device that is provided with the power mediating module or receives power via the power mediating module. A user authenticating electrical outlet or connector according to an embodiment of the present invention comprises: an authenticating terminal for receiving authenticating power for user authentication and a transmitted electrical outlet operating password; an authenticating device operated by the authenticating power and determining whether the electrical outlet operating password corresponds to electrical outlet ID information; and a micro-current limiting device for allowing a (Continued)

micro-current to flow when a power consuming device is connected to the user authenticating electrical outlet or connector. The authenticating power is obtained from the micro-current and is supplied from the outside via the authenticating terminal. When the electrical outlet operating password corresponds to the electrical outlet ID information, main power for the power consuming device is supplied from the main power supply to the outside.

14 Claims, 9 Drawing Sheets

(51) Int. Cl.
*H01R 13/713* (2006.01)
*H04W 12/06* (2009.01)
*H04W 88/04* (2009.01)
*B60L 11/18* (2006.01)
*H02J 7/00* (2006.01)
*H04L 29/06* (2006.01)

(52) U.S. Cl.
CPC ........... *H04W 12/06* (2013.01); *H04W 88/04* (2013.01); *B60L 11/1816* (2013.01); *B60L 11/1846* (2013.01); *H02J 7/0027* (2013.01); *H02J 2007/0001* (2013.01); *H04L 63/083* (2013.01); *Y02D 70/00* (2018.01); *Y02T 10/7055* (2013.01)

(58) Field of Classification Search
USPC .................................................. 439/620.21
See application file for complete search history.

(56) References Cited

FOREIGN PATENT DOCUMENTS

| | | |
|---|---|---|
| KR | 10-0999426 B1 | 12/2010 |
| KR | 10-2012-0101699 A | 9/2012 |
| KR | 10-1402062 B1 | 6/2014 |

\* cited by examiner

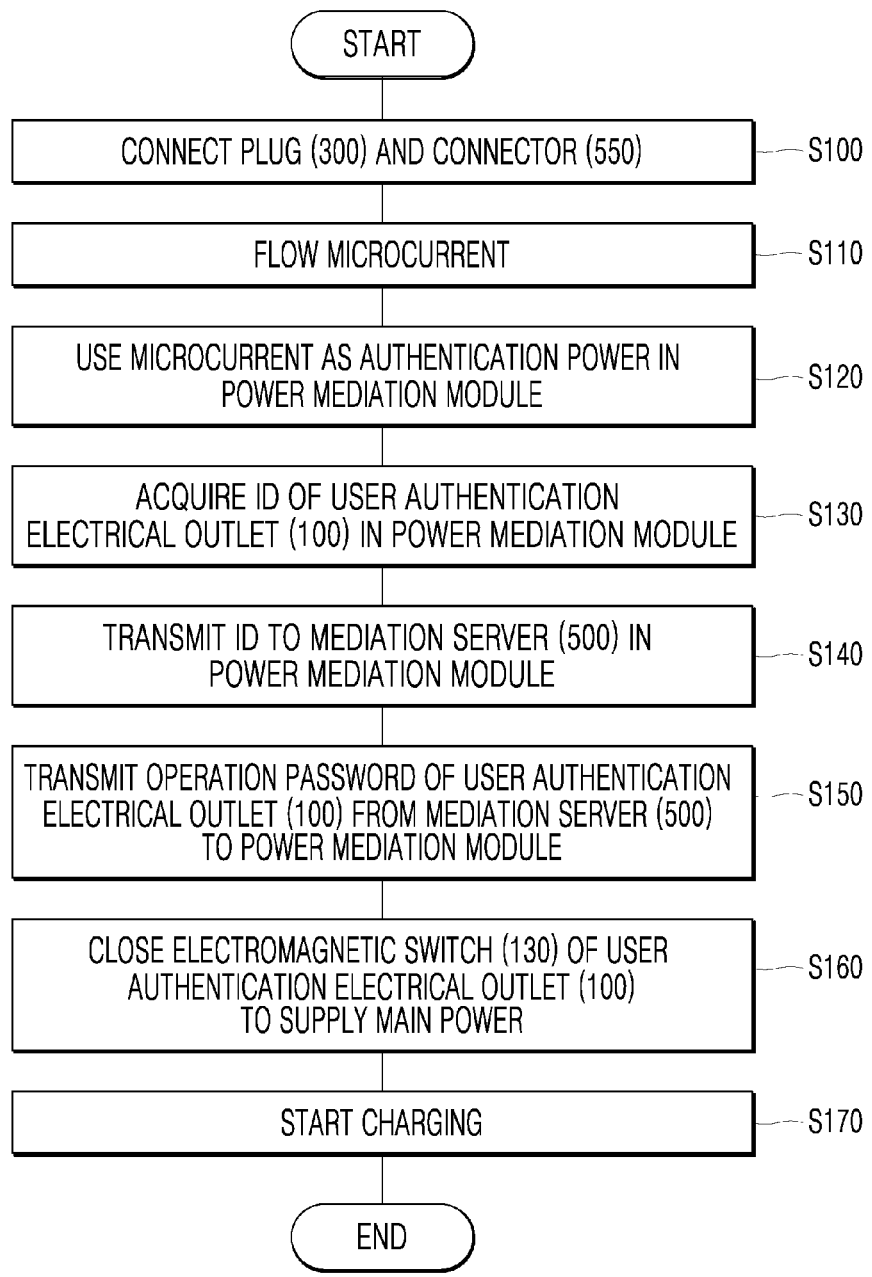

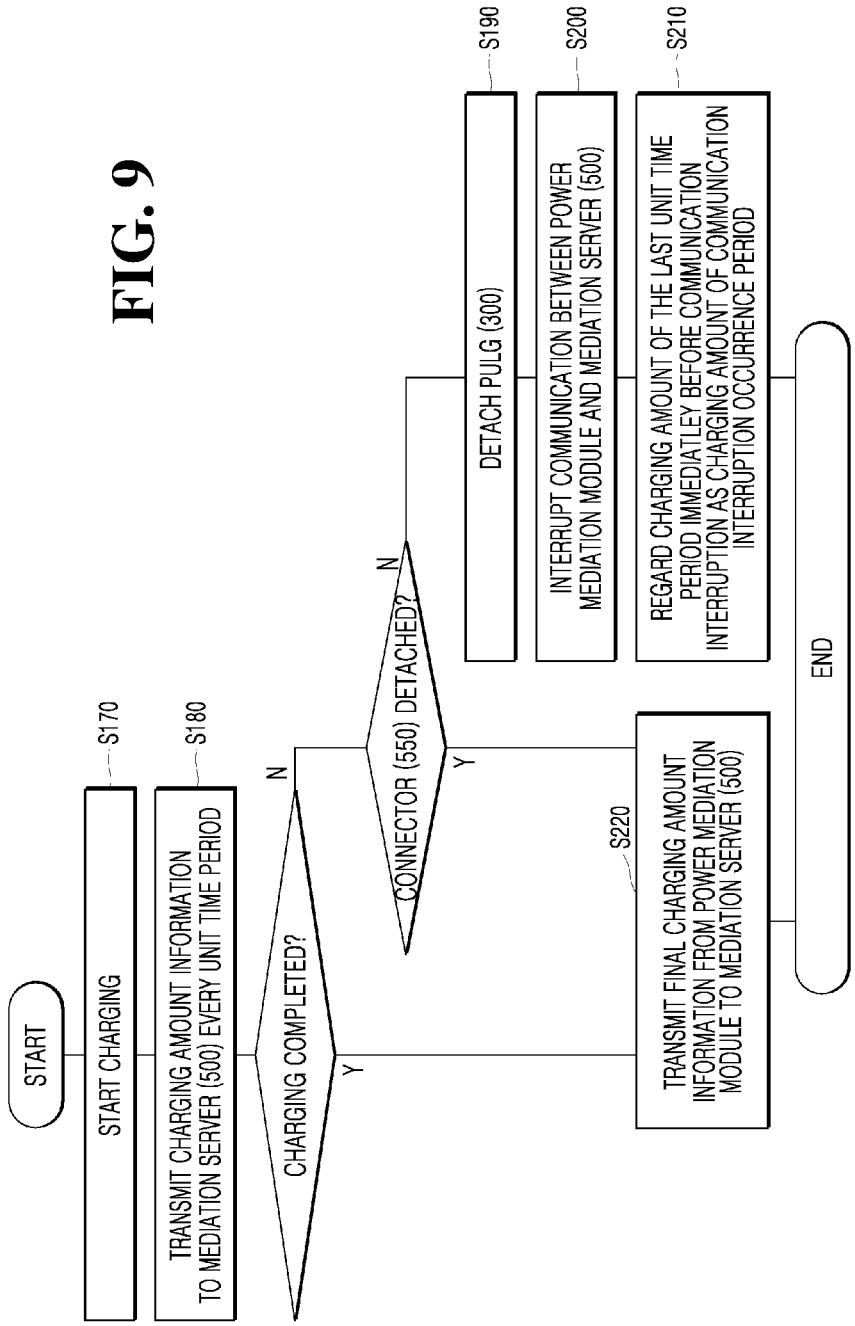

USER AUTHENTICATING ELECTRICAL OUTLET OR CONNECTOR, POWER MEDIATING MODULE, AND POWER CONSUMING DEVICE

CROSS-REFERENCE TO RELATED APPLICATIONS

This application is a 371 national phase of International Application No. PCT/KR2016/001203 filed on Feb. 3, 2016, which claims priority to Korean Application No. 10-2015-0016941 filed on Feb. 3, 2015, which applications are incorporated herein by reference.

TECHNICAL FIELD

The present invention relates to a user authentication electrical outlet or connector consuming no standby power while maintaining security, a power mediation module capable of supplying main power from the user authentication electrical outlet or connector to a power demanding device, and a power demanding device including the power mediation module or connected to and charged by the user authentication electrical outlet or connector via the power mediation module.

BACKGROUND ART

The number of power demanding devices that are to be charged with a large amount of electricity, especially mobile power demanding devices such as electric vehicles, is increasing. These power demanding devices sometimes require the power demanding devices to be supplied with power from where the owners of the power demanding devices do not own or reside. For this reason, for example, power feeders such as electrical outlets, multi-taps and electric vehicle chargers with user authentication functions, which can receive power in a place where the owner of an electric vehicle does not own or reside, for example, in an apartment ground parking lot, have been developed. However, components for user authentication of such a power feeder consume power (standby power) at the time of standby operation. Further, the existing power feeder may have inconsistency between a person who pays a cost for standby power (for example, a building owner/resident) and a real actual user (for example, an electric vehicle owner).

SUMMARY

Accordingly, it is an object of the present invention to provide a user authentication electrical outlet or connector that consumes no standby power while maintaining security.

It is another object of the present invention to provide a power mediation module allowing main power to be supplied from a user authentication electrical outlet or connector to a power demanding device without any standby power consumption while maintaining security.

It is another object of the present invention to provide a power demanding device including a power mediation module or connected to and charged by a user authentication electrical outlet or connector that consumes no standby power while maintaining security, via the power mediation module.

The objects of the present invention are not limited to the above-mentioned ones, and the other unmentioned objects will be clearly understood by those skilled in the art to which the present invention pertains from the following description.

In accordance with an aspect of the present invention for a user authentication electrical outlet or connector, a user authentication electrical outlet or connector comprises: an authentication terminal configured to receive authentication power for user authentication and an electrical outlet operation password; an authentication device operated with the authentication power and configured to determine whether or not the electrical outlet operation password corresponds to electrical outlet ID information; and a microcurrent limiting device configured to allow a microcurrent to flow when a power demanding device is connected to the user authentication electrical outlet or connector. The authentication power is obtained from the microcurrent and supplied from the outside via the authentication terminal, and main power for the power demanding device is supplied from a main power supply to the outside when the electrical outlet operation password corresponds to the electrical outlet ID information.

In the aspect of the user authentication electrical outlet or connector, the electrical outlet or connector receives an electrical outlet ID request signal from the outside via the authentication terminal and transmits the electrical outlet ID information to the outside.

In the aspect of the user authentication electrical outlet or connector, the microcurrent flows no longer through the microcurrent limiting device when the power demanding device is disconnected from the user authentication electrical outlet or connector.

In the aspect of the user authentication electrical outlet or connector, the authentication terminal of the electrical outlet or connector is wirelessly connected to the outside and wirelessly receives the authentication power and the electrical outlet operation password.

In the aspect of the user authentication electrical outlet or connector, the maximum value of the microcurrent is tens of mA.

In the aspect of the user authentication electrical outlet or connector, the user authentication electrical outlet or connector provides allowable current amount information of the electrical outlet or connector directly to the outside through the electrical outlet ID information.

In the aspect of the user authentication electrical outlet or connector, the main power for the power demanding device is supplied from the main power supply to the outside by closing an electromagnetic switch, the electromagnetic switch is closed by receiving DC power from the outside, and the closing of the electromagnetic switch is maintained by continuously using the DC power or by using a part of the main power which is AC power after the electromagnetic switch is closed.

In the aspect of the user authentication electrical outlet or connector, the microcurrent limiting device is a resettable fuse.

In accordance with an aspect of the present invention for a power mediation module, a power mediation module: receives from a user authentication electrical outlet or connector a microcurrent allowed to flow through a microcurrent limiting device when a power demanding device is connected to the user authentication electrical outlet or connector; provides authentication power obtained from the microcurrent to the user authentication electrical outlet or connector while transmitting an electrical outlet operation password to the user authentication electrical outlet or connector; and allows main power from the user authentication electrical outlet or connector to be supplied to the power demanding device after user authentication.

In the aspect of the power mediation module, the power mediation module includes an AC/DC converter for converting the microcurrent into a direct current to generate authentication power.

In the aspect of the power mediation module, the power mediation module transmits power amount information caused by the power demanding device to a mediation server every unit time period.

In the aspect of the power mediation module, the power mediation module receives allowable current amount information of the user authentication electrical outlet or connector corresponding to electrical outlet ID information of the user authentication electrical outlet or connector from a mediation server.

In the aspect of the power mediation module, the microcurrent limiting device is a resettable fuse.

In accordance with an aspect of the present invention for a power demanding device, a power demanding device comprises a power mediation module according to any one of claims 9 to 13 or is connected to and charged by a user authentication electrical outlet or connector via the power mediation module.

Other details of the present invention are included in the detailed description and figures.

BRIEF DESCRIPTION OF DRAWINGS

FIG. 8 is a flowchart illustrating a process of starting electric charging of an electric vehicle in a user authentication electrical outlet or connector, a power mediation module and an electric vehicle according to an embodiment of the present invention.

FIG. 9 is a flowchart illustrating a process of completing the electric charging of the electric vehicle in a user authentication electrical outlet or connector, a power mediation module and an electric vehicle according to an embodiment of the present invention.

DETAILED DESCRIPTION

Figure 1:
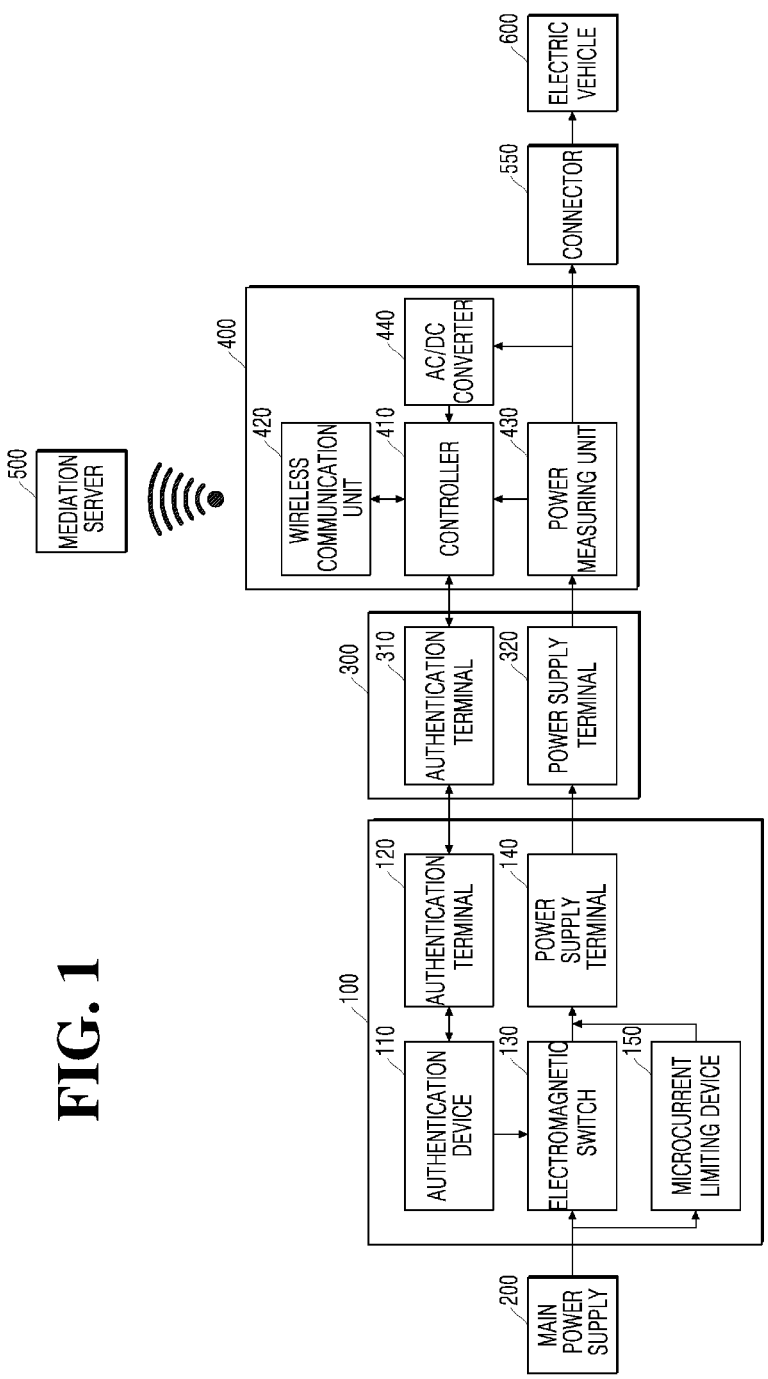
FIG. 1 is a diagram illustrating a user authentication electrical outlet or connector, a power mediation module, and an electric vehicle according to an embodiment of the present invention.

The above and other aspects, features and advantages of the invention will become apparent from the following description of the following embodiments given in conjunction with the accompanying drawings. However, the present invention is not limited to the embodiments disclosed below, and may be implemented in various forms. The embodiments of the present invention is provided to make the disclosure of the present invention complete and fully inform those skilled in the art to which the present invention pertains of the scope of the present invention. The same reference numerals denote the same elements throughout the specification.

The terms used herein are provided to describe the embodiments but not to limit the present invention. In the specification, the singular forms include plural forms unless particularly mentioned. The terms "comprising" and/or "comprises" used in the specification mean that the mentioned elements, steps, operations, and/or devices do not exclude existence or addition of one or more other elements, steps, operations, and/or devices.

Unless otherwise defined, all terms (including technical and scientific terms) used herein have the same meaning as commonly understood by those skilled in the art to which the present invention pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

A case where a user authentication electrical outlet or connector according to the present invention is mainly used to charge an electric vehicle will be described below, but the present invention is not limited thereto. The user authentication electrical outlet or connector according to the present invention may be applied not only to electric vehicles but also to all power demanding devices requiring electrical charging with a large amount of electricity, especially mobile power demanding devices. The user authentication electrical outlet or connector according to the present invention may be in the form of an electrical outlet that may be embedded in a wall of a building or in the form of a connector such as a cable drawn from the wall of the building, for example. In other words, the following description about a case where the user authentication electrical outlet or connector according to the present invention is in the form of an electrical outlet is merely illustrative.

Referring to FIG. 1, a user authentication electrical outlet 100, a power mediation module 400 and an electric vehicle 600 according to an embodiment of the present invention will be described. FIG. 1 is a block diagram illustrating a user authentication electrical outlet or connector, a power mediation module and an electric vehicle according to an embodiment of the present invention.

The user authentication electrical outlet 100 may include a microcurrent limiting device 150, a power supply terminal 140, an authentication device 110, an authentication terminal 120 and an electromagnetic switch 130.

When a plug 300 is inserted into the user authentication electrical outlet 100, the microcurrent limiting device 150 allows a microcurrent to flow from a main power supply 200 through the microcurrent limiting device 150 into a power supply terminal 140 of the electrical outlet 100. (No microcurrent is flown when the plug 300 is not inserted into the electrical outlet 100). Here, the microcurrent limiting device 150 may be configured with an inexpensive and simple circuit using, for example, two resistors. The microcurrent thus flown is transferred from the power supply terminal 140 of the electrical outlet 100 to a power supply terminal 320 of the plug 300.

The microcurrent limiting device 150 may be implemented with, as another example, a resettable fuse. An example of the resettable fuse may include a poly switch which is an electronic device manufactured by Reychem of USA. While the poly switch is initially in a very low resistance (0 to 5 ohms) state, it has a high resistance due to Joule heat caused by to an overcurrent when the overcurrent flows into a circuit. When the poly switch has such a high resistance, the poly switch acts as a fuse to open the circuit. The resettable fuse is different from a typical fuse in that the former again has the low resistance state for reuse when the cause of the overcurrent is removed. In this embodiment, the poly switch may be selected to have allowable power that can limit the magnitude of the microcurrent to tens of mA or less. For example, a poly switch with allowable power of 20 W or less may be selected.

The authentication device 110 is activated by receiving authentication power obtained from the microcurrent and transmitted from the authentication terminal 310 of the plug 300 to the authentication terminal 120 of the electrical outlet 100. More specifically, the authentication device 110 receives an electrical outlet ID request signal, which is generated by a controller 410 of the power mediation module 400 and is transferred from the authentication terminal 310 of the plug 300 to the authentication terminal 120 of the electrical outlet 100, and transmits electric outlet ID information to the authentication terminal 120 in response to the electrical outlet ID request signal. The electrical outlet ID information thus transmitted is transferred from the authentication terminal 120 of the electrical outlet 100 to the authentication terminal 310 of the plug 300.

Here, apart from the above-mentioned method, the electrical outlet ID checking procedure may be performed with a method of attaching an RFID or NFC to the electrical outlet 100 and installing an RFID or NFC reader on the plug 300 to directly read the electrical outlet ID information from the electrical outlet 100. In addition, security can be further strengthened when a dynamic key value is transmitted, together with the electrical outlet ID information, to the plug 300 side.

After the electrical outlet ID checking procedure, the authentication device 110 receives an electrical outlet operation password transmitted from the authentication terminal 310 of the plug 300 to the authentication terminal 120 of the electrical outlet 100. The authentication device 110 checks the transmitted electrical outlet operation password and, if it is correct, closes the electromagnetic switch 130 so as to allow main power to be supplied from the main power supply 200. The main power is transferred to the power supply terminal 320 of the plug 300 via the power supply terminal 140 of the electrical outlet 100.

Once the electromagnetic switch 130 is closed, by using DC power supplied from the authentication terminal 310 of the plug 300 or by using a part of AC power supplied from the main power supply 200, the electromagnetic switch 130 can remain closed. In one example, according to the specifications of the electromagnetic switch 130, AC power may be used to control the electromagnetic switch 130, in which case the electromagnetic switch 130 can remain closed by using a part of the AC power from the main power supply 200, eliminating a need to employ an AC/DC converter. In other words, the authentication device 110 is operated by the DC power, whereas the electromagnetic switch 130 can remain driven by the AC power after being triggered with the DC power supplied front the outside.

In the case where the electromagnetic switch 130 remains closed by using the DC power supplied from the authentication terminal 310, when the plug 300 is detached, the electromagnetic switch 130 is opened since the DC power for controlling the electromagnetic switch 130 cannot be supplied from the authentication terminal 310. Alternatively, in the case where the electromagnetic switch 130 remains closed by using a part of the AC power supplied from the main power supply 200, when the plug 300 is detached, the electromagnetic switch 130 is opened since the main power supply circuit is opened so that the AC power cannot be supplied from the main power supply 200 any longer.

The power mediation module 400 may include an AC/DC converter 440, a controller 410, a wireless communication unit 420 and a power measuring unit 430.

The AC/DC converter 440 converts a microcurrent supplied to the AC/DC converter 440 via the power supply terminal 320 of the plug 300 and the power measuring unit 430 into a direct current to generate power for authentication.

The controller 410 controls starting the supply of power for authentication to the authentication device 110, requesting an electrical outlet ID and receiving electrical outlet ID information, and acquiring an electrical outlet operation password from a mediation server 500. More specifically, the controller 410 supplies the authentication power obtained by the AC/DC converter 440 to the authentication device 110 via the authentication terminal 310 of the plug 300 and the authentication terminal 120 of the electrical outlet 100. In addition, the controller 410 sends the electrical outlet ID request signal to the electrical outlet 100 side and obtains the electrical outlet ID information transmitted from the electrical outlet 100 in response to this electrical outlet ID request signal. Then, the controller 410 acquires the electrical outlet operation password through wireless communication with the mediation server 500. The electrical outlet operation password thus obtained is provided to the authentication device 110 via the authentication terminal 310 of the plug 300 and the authentication terminal 320 of the electrical outlet 100.

Here, the electrical outlet operation password may be acquired from a database stored in the power mediation module 400 or the electric vehicle 600, unlike the one shown in FIG. 1. However, as the number of user authentication electrical outlets increases, it may become difficult to store all the electrical outlet operation passwords in the power mediation module 400 or the electric vehicle 600. Accordingly, the power mediation module 400 may acquire an electrical outlet operation password from the mediation server 500 located outside via the wireless communication unit 420 in the process of acquiring the electrical outlet operation password. Obtaining the electrical outlet operation password from the outside in this manner can reduce the risk of leakage of the entire electrical outlet operation passwords out of a database, which may occur when the mediation server 500 is not separately managed.

The power measuring unit 430 measures the amount of power supplied from the user authentication electrical outlet 100 via the power supply terminal 320 of the plug 300. The measured power is supplied to the electric vehicle 600 connected to the power mediation module 400 by a connector 550. At the same time, the measured amount of power is sent to the controller 410 and information on the input/output power amount of the electric vehicle is transferred to the mediation server 500 through wireless communication via the wireless communication unit 420 based on the measured amount of power.

In FIG. 1, the authentication terminal 120 of the electrical outlet 100 may be connected to the authentication terminal 310 of the plug 300 wirelessly or by wire. For example, when the authentication terminal 120 of the electrical outlet 100 is wirelessly connected to the authentication terminal 310 of the plug 300, the authentication terminal 120 of the electrical outlet 100 may be implemented in the form of a wireless power receiving and information transmitting/receiving unit which is capable of wirelessly receiving authentication power from the authentication terminal 310 of the plug 300 and wirelessly transmitting/receiving information to/from the authentication terminal 310 of the plug 300. Correspondingly, the authentication terminal 310 of the plug 300 may be implemented in the form of a wireless power transmitting and information transmitting/receiving unit which is capable of wirelessly transmitting authentication power to the authentication terminal 120 of the electrical outlet 100 and wirelessly transmitting/receiving information to/from the authentication terminal 120 of the electrical outlet 100.

Figure 2:
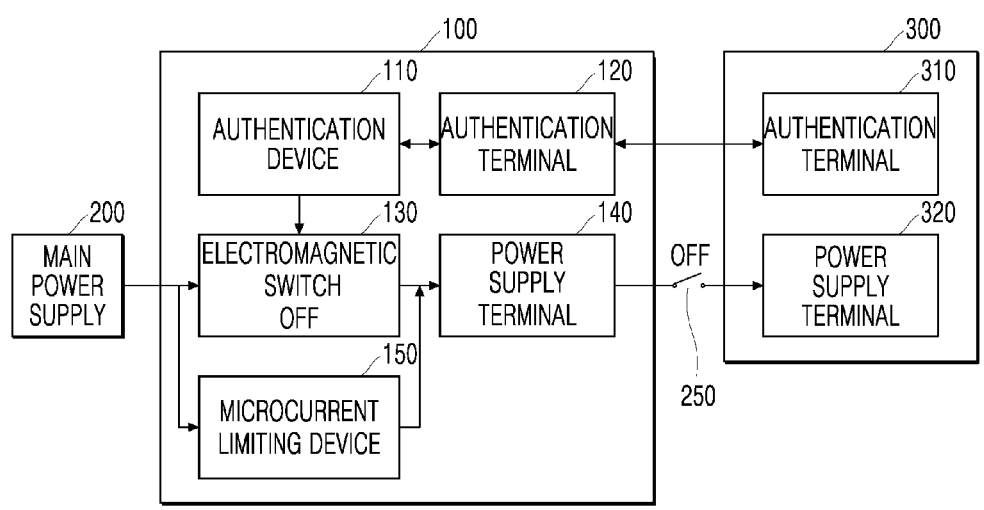
FIG. 2 is a diagram for explaining a flow of current in the user authentication electrical outlet or connector on standby.
Figure 3:
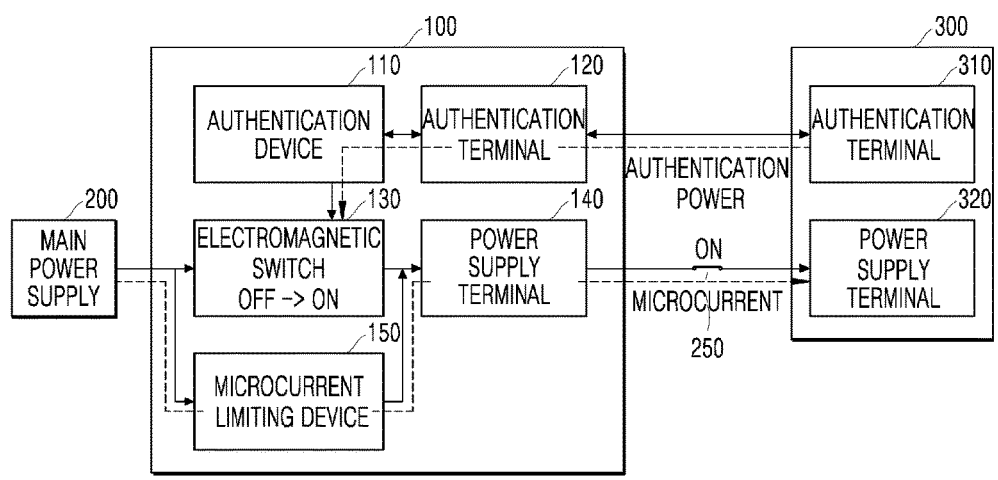
FIG. 3 is a diagram for explaining a flow of current in the user authentication electrical outlet or connector on user authentication.
Figure 4:
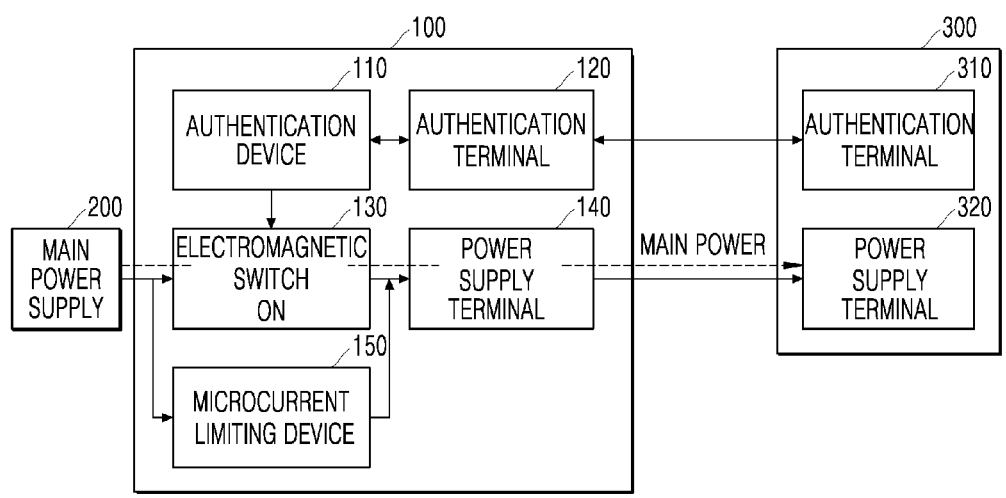
FIG. 4 is a diagram for explaining a flow of current in the user authentication electrical outlet or connector on electric charging.

Flows of current in the user authentication electrical outlet or connector on standby, on user authentication and on electric charging/discharging will be described with reference to FIGS. 2 to 4. FIG. 2 is a diagram for explaining a flow of current in the user authentication electrical outlet or connector on standby. FIG. 3 is a diagram for explaining a flow of current in the user authentication electrical outlet or connector on user authentication. FIG. 4 is a diagram for explaining a flow of electric current in the user authentication electrical outlet or connector on electric charging/discharging.

As described above, in the user authentication electrical outlet or connector according to the present invention, when the electrical outlet is not inserted into the plug, no microcurrent is flown since the entire circuit of the user authentication electrical outlet or connector is not a closed loop. Only when the electrical outlet is inserted into the plug, the entire circuit forms a closed loop to flow a microcurrent. That is, in the present invention, inserting the electrical outlet into the plug serves to change the entire circuit of the user authentication electrical outlet or connector front an open loop to a closed loop. Therefore, according to the present invention, there is no need to provide a separate circuit for detecting whether or not the electrical outlet is inserted. In order to show this visually, the fact that the electrical outlet is not inserted into the plug is represented by a switch 250 being opened (indicated as "OFF") in FIG. 2, while the fact that the electrical outlet is inserted into the plug is represented by a switch 250 being closed (indicated as "ON") in FIGS. 3 and 4.

Referring to FIG. 2, when the electrical outlet is not inserted into the plug, that is, when the electrical outlet is on standby, since the switch 250 is opened, the entire circuit of the user authentication electrical outlet or connector is in an open loop state where neither microcurrent nor current flows between the user authentication electrical outlet 100 and the plug 300. Therefore, according to the present invention, there is no power consumption in the standby state, that is, standby power consumption, in the user authentication electrical outlet or connector 100.

Referring to FIG. 3, when the electrical outlet is inserted into the plug, the entire circuit forms a closed loop. At this time, since the electromagnetic switch 130 is still in the open state (OFF), a current does not flow through the electromagnetic switch 130 during authentication but flows only through the microcurrent limiting device 150. However, as described above, the microcurrent limiting device 150 limits the amount of current flowing through the microcurrent limiting device 150. That is, although the main power is supplied from the main power supply 200, only a microcurrent whose amount is tens mA is flown through the microcurrent limiting device 150, for example, the poly switch. The microcurrent thus flowed is transferred to the plug side. Then, the microcurrent is converted into a direct current by the AC/DC converter (see 440 in FIG. 1) described above to generate authentication power which is then provided to the electrical outlet 100.

According to the present invention, it should be particularly noted that the authentication device 110 of the electrical outlet 100 is operated with the authentication power received from the outside of the electrical outlet 100. In other words, the microcurrent is converted into a direct current on the power demand side rather than on the power supply side, and the authentication power thus generated is reversely provided from the power demand side to the power supply side. When the authenticating device 110 is operated with the authentication power thus provided, the user authentication process as described above is performed.

When a user is authenticated through the user authentication process, the electromagnetic switch 130 is closed as described later with reference to FIG. 4. At this time, the electromagnetic switch 130 may be closed or triggered with a direct current, like the authentication device 110. In order to show this, it is shown in FIG. 3 that the authentication power is also provided to the electromagnetic switch 130.

Referring to FIG. 4, when a user is authenticated through the user authentication process described with reference to FIG. 3, the electromagnetic switch 130 is closed to allow the main power to be supplied from the main power supply 200. When the electromagnetic switch 130 is closed in this way, theoretically, the resistance across the electromagnetic switch becomes close to 0, so that no current flows through the microcurrent limiting device 150.

Here, as described above with reference to FIG. 3, the electromagnetic switch 130 may be closed or triggered with the authentication power. However, once the electromagnetic switch 130 is closed, the closing of the electromagnetic switch 130 may be maintained by continuously using the authentication power or by using a part of the AC power supplied from the main power supply 200. It is shown in FIG. 4 that the authentication power is not supplied any more in order to show that the closing of the electromagnetic switch 130 is maintained by the AC power.

Figure 5:
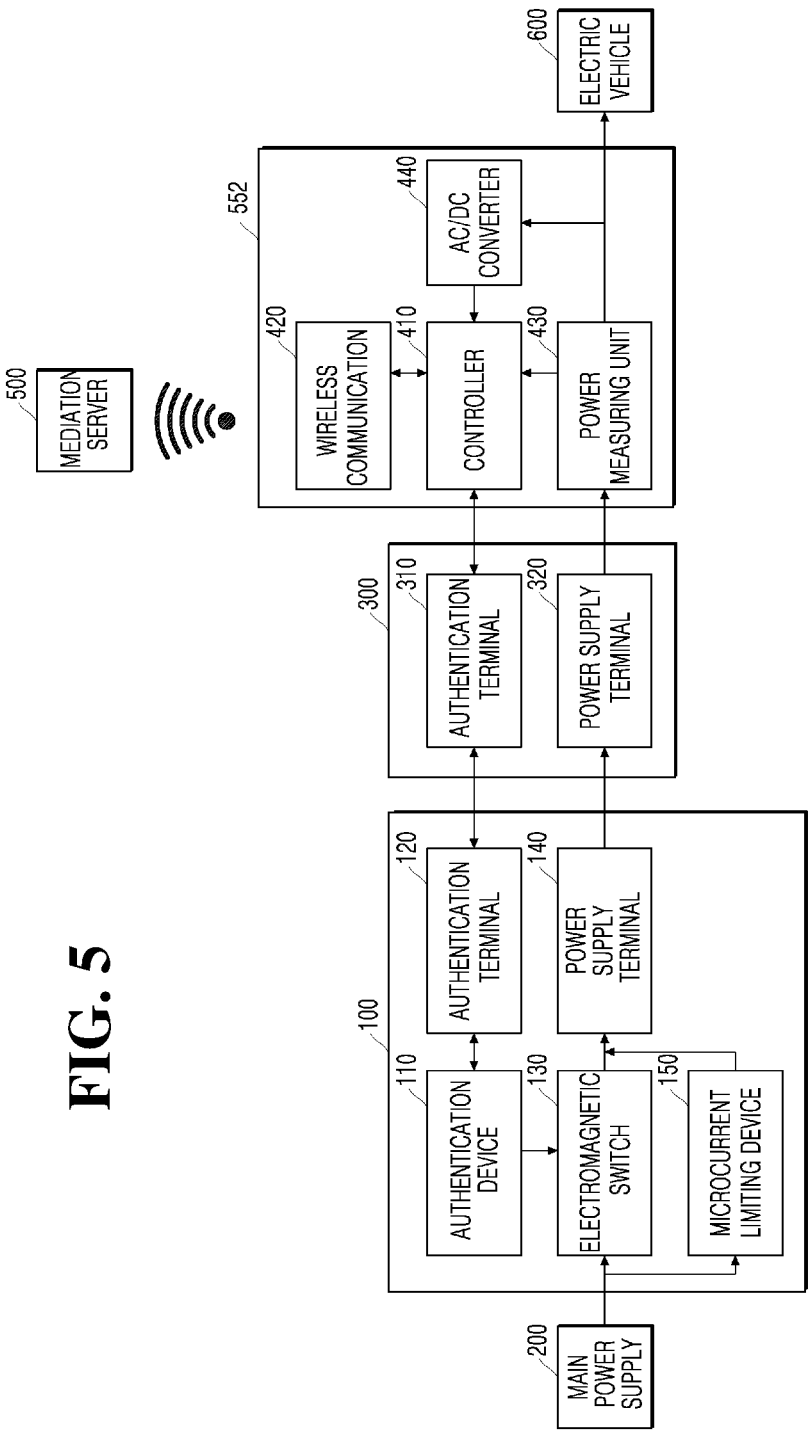
FIG. 5 is a block diagram illustrating a user authentication electrical outlet or connector, a power mediation module, and an electric vehicle wherein the power mediation module is accordance with another embodiment of the present invention.

A power mediation module according to another embodiment of the present invention will be described with reference to FIG. 5. FIG. 5 is a block diagram illustrating a user authentication electrical outlet or connector, a power mediation module, and an electric vehicle wherein the power mediation module is accordance with another embodiment of the present invention.

In the embodiment shown in FIG. 5, a connector 552 for connection to an electric vehicle 600 which is a power demanding device is integrated with the power mediation module 400. According to this embodiment, since the power mediation module is built in the connector 552 and only the plug and the connector are apparently left, it is possible to reduce or eliminate the risk of damage, flooding and theft of the power mediation module. A mechanical/electronic lock may be incorporated into the connector 552 to prevent theft. In FIG. 5, the same or similar elements as FIG. 1 are denoted by the same reference numerals as in FIG. 1 and therefore, detailed explanation of which will not be repeated for the sake of brevity.

Figure 6:
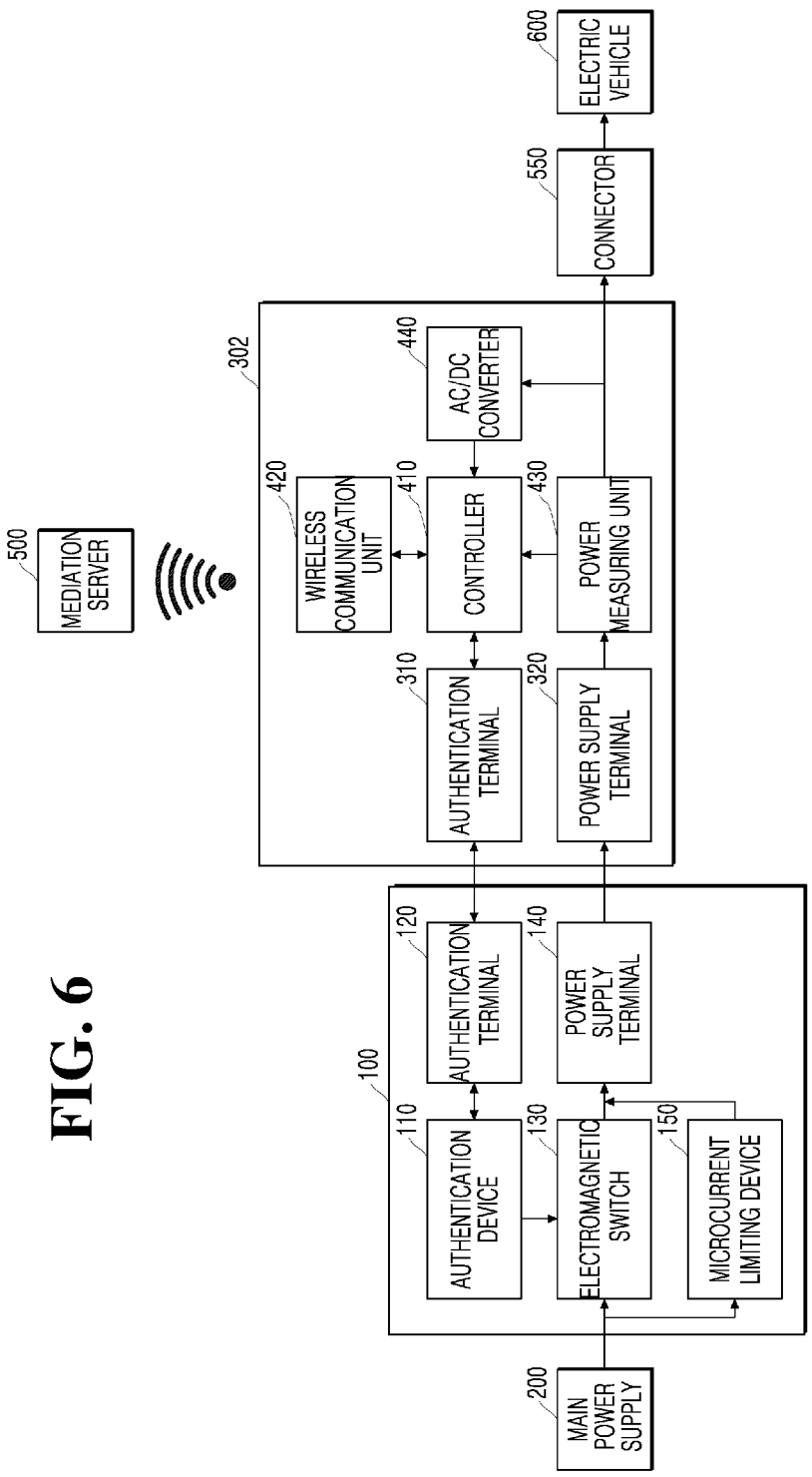
FIG. 6 is a block diagram illustrating a user authentication electrical outlet or connector, a power mediation module, and an electric vehicle wherein the power mediation module is accordance with still another embodiment of the present invention.

A power mediation module according to still another embodiment of the present invention will be described with reference to FIG. 6. FIG. 6 is a block diagram illustrating a user authentication electrical outlet or connector, a power mediation module, and an electric vehicle wherein the power mediation module is accordance with still another embodiment of the present invention.

In the embodiment shown in FIG. 6, a plug 302 for connection to a user authentication electrical outlet 100 which is a power supply device is integrated with the power mediation module. According to this embodiment, since the power mediation module is built in the plug 302 and only the plug and the connector are apparently left, it is possible to reduce or eliminate the risk of damage, flooding and theft of the power mediation module. A mechanical/electronic lock may be incorporated into the plug 302 to prevent theft. In FIG. 6, the same or similar elements as FIG. 1 are denoted by the same reference numerals as in FIG. 1 and therefore, detailed explanation of which will not be repeated for the sake of brevity.

Figure 7:
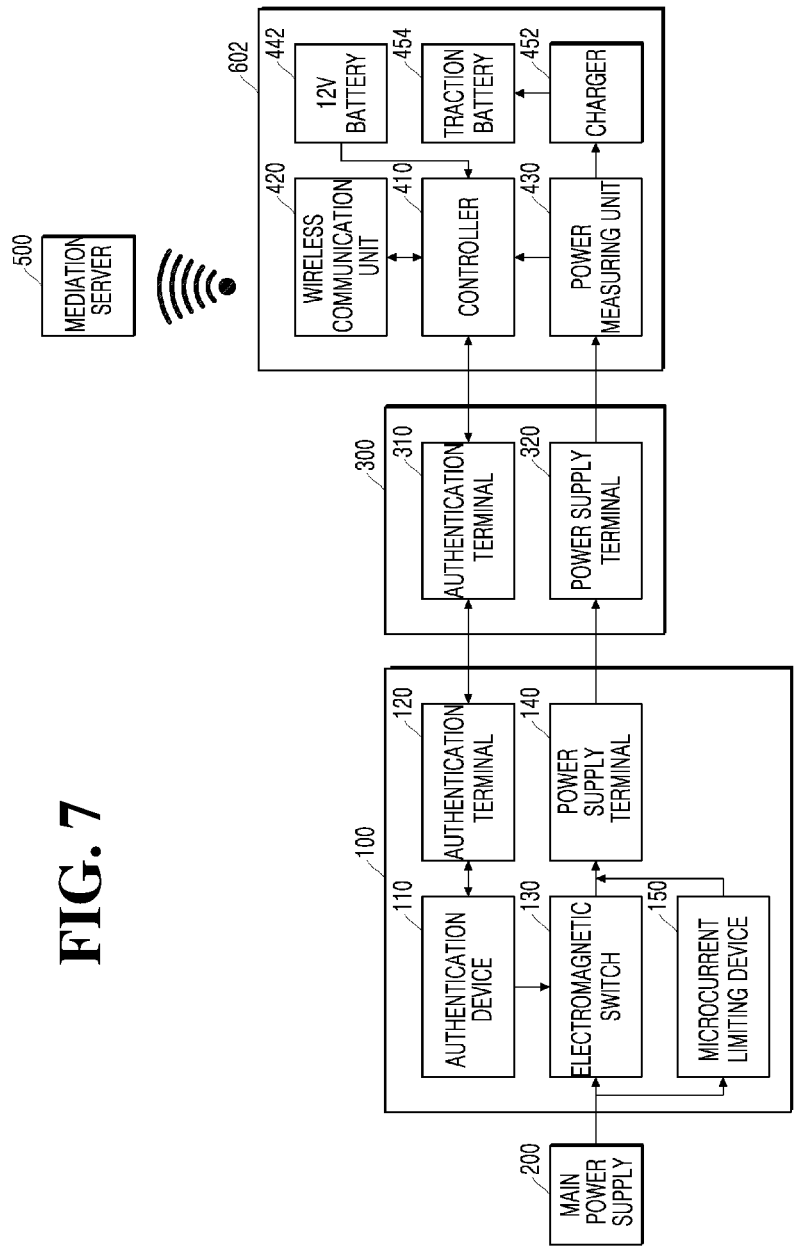
FIG. 7 is a block diagram illustrating a user authentication electrical outlet or connector and an electric vehicle wherein the electric vehicle is accordance with another embodiment of the present invention.

An electric vehicle according to another embodiment of the present invention will be described with reference to FIG. 7. FIG. 7 is a block diagram illustrating a user authentication electrical outlet or connector and an electric vehicle wherein the electric vehicle is accordance with another embodiment of the present invention.

An electric vehicle 602 shown in FIG. 7 includes a power mediation module, unlike the electric vehicle 600 shown in FIGS. 1, 5 and 6 which is connected to and electrically charged by the user authentication electrical outlet or connector via the power mediation module. Specifically, the electric vehicle 602 may include a wireless communication unit 420, a controller 410 and a power measuring unit 430. In the electric vehicle 602 shown in FIG. 7, a battery 442 for electrical equipment (for example, 12V battery) in the electric vehicle may provide authentication power (DC power) via the controller 410 to the user authentication electrical outlet 100. The battery 442 for electrical equipment (for example, 12V battery) is a battery used to operate the electrical equipment in the electric vehicle. In addition, the electric vehicle 602 may further include a charger 452 and a traction battery 454. The main power measured by the power measuring unit 430 may be converted into a direct current in the charger 452 of the electric vehicle 602 and stored in the traction battery 454. The traction battery 454 is a driving battery of the electric vehicle 602. In FIG. 7, the same or similar elements as FIG. 1 are denoted by the same reference numerals as in FIG. 1 and therefore, detailed explanation of which will not be repeated for the sake of brevity.

A process of electrically charging an electric vehicle in a user authentication electrical outlet or connector, a power mediation module and an electric vehicle according to the present invention will be described with further reference to FIGS. 8 and 9.

FIG. 8 is a flowchart illustrating a process of starting electric charging of an electric vehicle in a user authentication electrical outlet or connector, a power mediation module and an electric vehicle according to an embodiment of the present invention. FIG. 9 is a flowchart illustrating a process of completing the electric charging of the electric vehicle.

The connector 550 or 552 is inserted into the electric vehicle 600 and the plug 300 is inserted into the user authentication electrical outlet 100 (S100). In the embodiment shown in FIG. 7, a process of inserting the connector into the electric vehicle 602 is not required. A microcurrent is flown by inserting the plug 300 into the user authentication electrical outlet 100 (S110).

When the microcurrent is flown into the power mediation module 400, the power mediation module 400 converts the microcurrent into authentication power and the authentication power is used (S120). An ID of the user authentication electrical outlet 100 is acquired (S130), the acquired ID of the user authentication electrical outlet 100 is transmitted to the mediation server 500 (S140), and an electrical outlet operation password corresponding to the ID of the electrical outlet 100 is acquired from the mediation server 500 (S150).

Upon receiving the electrical outlet operation password from the power mediation module 400, the user authentication electrical outlet 100 checks the electrical outlet operation password and, if it is correct, closes the electromagnetic switch 130 so as to allow the main power to be supplied from the main power supply 200 to the power supply terminal 140 via the electromagnetic switch 130 (S160).

As the supply of the main power is started, the electric vehicle 600 begins to be electrically charged (S170). At the same time, the power mediation module 400 transmits charging amount information, which is provided to the electric vehicle every unit time period, to the mediation server 500 (S180). When the electric vehicle is fully electrically charged, the final charging amount information is transmitted from the power mediation module 400 to the mediation server 500 (S220).

Alternatively, when the plug 300 and/or the connector 550 is detached before the electric vehicle is fully electrically charged, the final charging amount information is determined as follows, depending on whether or not the connector 550 has been removed earlier than the plug 300. If the connector 550 has been detached earlier, the final charging amount information is transmitted from the power mediation module to the mediation server 500 in the same manner as when the electric vehicle is fully electrically charged (S220).

However, if the plug 300 has been detached from the user authentication electrical outlet 100 earlier than the connector 550 (S190), since the microcurrent is flown no longer, the communication between the power mediation module 400 and the mediation server 500 is interrupted due to the interruption of the authentication power (S200). At this time, the amount of charging in the last unit time period before the interruption of the communication between the power mediation module 400 and the mediation server 500 is regarded as the amount of charging in the unit time period in which the communication interruption occurs (S210).

In the above-described electric vehicle charging process, in some cases, the allowable current amount of the user authentication electrical outlet may be different due to the limitation by a power transmission line or the like. In preparation for these cases, it is necessary to classify and provide the allowable current amount information of the user authentication electrical outlet. An example of a method for providing the allowable current amount information may include (i) a method in which the user authentication electrical outlet or connector directly supplies the allowable current amount information to the power mediation module through the electrical outlet ID information and (ii) a method in which the allowable current amount information of the user authentication electrical outlet or connector corresponding to the electrical outlet ID information is stored in the mediation server and the power mediation module receives the stored allowable charging amount information from the mediating server during an authentication process.

According to the user authentication electrical outlet 100, the power mediation module 400 and the electric vehicle 600 according to the present invention described above, the authentication procedure is performed by using the microcurrent flown by inserting the plug 300 into the electrical outlet 100. Therefore, the power mediation module 400 may not have its own battery.

Further, since the microcurrent limiting device 150 is used to limit the magnitude of the microcurrent, most electric devices including a mobile phone charger and an electric shaver cannot be used without going through an authentication procedure.

Specifically, the maximum value of the microcurrent in the user authentication electrical outlet 100 according to the present invention may be tens of mA at the time of unauthentication (that is, before the authentication procedure is performed). For example, assuming that the microcurrent is 10 mA (0.01 A), when a plug of the 3,000 W electric heater is inserted into the user authentication electrical outlet 100 according to the present invention, only the maximum of 2.2 W (=220 V*10 mA) can be supplied so that the electric heater cannot be used at all before going through the authentication procedure. For another example, a smartphone charger requires a current of 0.15 A. Since the maximum value of the microcurrent in the user authentication electrical outlet 100 according to the present invention is only tens of mA, the smartphone charger cannot be used at all before going through the authentication procedure.

In other words, although the microcurrent in the embodiment of the present invention have sufficient magnitude as authentication power for the authentication procedure, it is actually difficult to use even an electric device consuming a small amount of power such as a smartphone charger (0.15 A) with such a microcurrent. Even if the electricity is used without authorization for a month, for example, assuming that the microcurrent is 10 mA (0.01 A), the power is only 1,630 W (1.63 kW) (=220V*0.01 A*24 hours*31 days) which does not amount to 200 Won on average.

In addition, according to the user authentication electrical outlet 100, the power mediation module 400 and the electric vehicle 600 according to the present invention, a microcurrent flows only when the plug 300 is inserted into the electrical outlet 100. When the plug 300 is detached from the electrical outlet 100, the electromagnetic switch 130 is opened to prevent a current from flowing from the main power supply 200 to the power mediation module 400 via the power supply terminal 140 of the electrical outlet 100 and the power supply terminal 320 of the plug 300. Further, in a state where the plug 300 is not inserted into the electrical outlet 100, even a microcurrent does not flow. Therefore, parts for user authentication do not consume electric power, that is, standby power, at the time of standby operation of the electrical outlet 100. This can eliminate a problem of inconsistency between a person who pays a cost for standby power (for example, a building owner) and a real actual user (for example, an electric car owner).

On the other hand, according to the user authentication electrical outlet 100, the power mediation module 400 and the electric vehicle 600 according to the present invention, the power mediation module 400 may not have its own battery as described above. In this case, when the plug 300 is detached from the electrical outlet 100, the power mediation module 400 can no longer send the power charging amount to the mediation server 500, which may cause a problem. In order to resolve this problem, according to the embodiment of the present invention, the wireless communication unit 420 of the power mediation connector 400 may periodically communicate with the mediation server 500, as described above with reference to FIGS. 8 and 9.

Specifically, the wireless communication unit 420 of the power mediation module 400 may communicate with the mediation server 500 every unit time period and transmit the power charging amount per unit time to the mediation server 500. If the electric vehicle 600 is completely electrically charged, the power charging amount is calculated for the entire time for which the main power is supplied after the plug 300 is inserted into the electrical outlet 100. Alternatively, if the plug 300 is detached from the electrical outlet 100 in the midway without fully charging the electric vehicle 600, the power charging amount transmitted to the mediation server 500 during the last unit time period before the detachment (that is, before communication interruption) may be regarded as the power charging amount in the unit time period in which the detachment (that is, communication interruption) occurs.

For example, assuming that the unit time period is one minute, if the last power charging amount is transmitted to the mediation server in 10 minutes after charging and the charging has been interrupted between 10 minutes and 11 minutes, the power charging amount between 9 minutes and 10 minutes may be regarded as the power charging amount between 10 minutes and 11 minutes. This is based on the fact that the electric vehicle is charged as a rating capacity up to 80 to 90% of the fully charging and then a current amount is suddenly dropped with an oblique line.

Unlike the previous example, the unit time period may be arbitrarily selected to be 10 minutes, 30 seconds, etc., instead of one minute. When the plug 300 is detached from the electrical outlet 100 in the midway without fully charging the electric vehicle 600, as can be seen from the above assumption, the power charging amount of the electric vehicle will be excessively estimated as the unit time period becomes longer and will be more accurately estimated as the unit time period becomes smaller. Therefore, it would be ideal if the power charging amount is transmitted in real time, but this may be impossible since the communication cost will increase due to the problem of the data communication amount. Preferably, the unit time period is one minute as in the previous example. In this case, if the electric vehicle is charged at 3.3 kW per hour with application of the electricity tariff for electric vehicles, an average electricity rate of 330 Won per hour will be incurred. Therefore, if one minute is taken as the unit time period, the electricity rate per minute will be 5.5 Won.

According to the above-described user authentication electrical outlet or connector, power mediation module and power demanding device (for example, electric vehicle) using the same according to the present invention, a microcurrent is flown when the power demanding device is connected to the electrical outlet or connector, the authentication power is obtained from the microcurrent to perform the user authentication, and the main power is supplied from the main power supply to the power demanding device after going through the user authentication. Therefore, there is no standby power consumption while waiting for connection with the electric vehicle. That is, the power can be supplied only to a user who is permitted to use in advance, without wasting power for user authentication at an ordinary time. In addition, this eliminates a need for additional mechanical lock to prevent illegal use of the electrical outlet or connector.

A conventional power feeder for charging an electric vehicle occupies a large volume and requires a communication device, a user authentication device and a DC power supply device for operating the same. However, according to the user authentication electrical outlet or connector, the power mediation module and the power demanding device (e.g., electric vehicle) using the same according to the present invention, only the authentication device 110 and the microcurrent device 150 which may be simply implemented with, e.g., two resistors are added to the electrical outlet 100 side and the remaining necessary devices are disposed outside the electrical outlet in the form of the wireless communication unit 420 of the power mediation module 400, for example. Thus, it is possible to maintain security while simplifying the structure of the stationary device, that is, the user authentication electrical outlet or connector.

The user authentication electrical outlet or connector, the power mediation module and the power demanding device (e.g., electric vehicle) using the same according to the present invention may have the following practical or commercial values.

Assuming that 10 electric vehicles are charged in a building underground parking lot having 100 parking surfaces, the conventional power feeder requires 10 electric vehicle-dedicated parking surfaces due to problems of standby power consumption and installation costs. Therefore, since it is necessary to provide dedicated parking surface for electric vehicle users, inconvenience may be incurred to both electric vehicle users and general vehicle users.

However, according to the user authentication electrical outlet or connector according to the present invention, even if it is installed on all 100 parking spaces, the installation costs are low and the standby power consumption is not affected at all. Therefore, since it is not necessary to divide the parking spaces of electric vehicles and general vehicles, all the car users can conveniently park their own vehicles and the electric vehicle users can charge their own electric vehicles irrespective of place, that is, without searching for electric vehicle-dedicated parking surfaces.

Finally, the user authentication electrical outlet or connector, the power mediation module and the power demanding device (e.g., electric vehicle) using the same according to the present invention may be applied to the electric vehicle and mediation server for location-based power mediation, which is disclosed in Korean Patent Application No. 10-2013-0038225 which is owned by the present applicant. Specifically, when the user authentication electrical outlet or connector, the power mediation module and the electric vehicle according to the present invention are applied to the electric vehicle and mediation server for location-based power mediation which is disclosed in Korean Patent Application No. 10-2013-0038225, a building owner can share electrical outlets for electric vehicles for power mediation without any worries while solving the security problem and eliminating the costs of standby power completely.

Although the exemplary embodiments of the present invention have been described with reference to the accompanying drawings, it will be understood by those skilled in the art to which the present invention pertains that the present invention can be carried out in other detailed forms without changing the technical spirits and essential features thereof. Therefore, the above-described embodiments are exemplary in all aspects, and should be construed not to be restrictive.

The invention claimed is:

1. A user authentication electrical outlet or connector which allows a main power to be supplied from a main power supply to a power demanding side when a power demanding device is authenticated through a user authentication process, the electrical outlet or connector comprising:

a microcurrent limiting device configured to allow a microcurrent to flow from the electrical outlet or connector to the power demanding side; and an authentication device operated with an authentication power and configured to perform the user authentication process;

wherein the microcurrent limiting device is a passive element and it is not until the power demanding device is connected to the electrical outlet or connector that a closed loop is formed for the microcurrent to flow through the microcurrent limiting device so that the microcurrent is supplied to the power demanding side, and, wherein the authentication power is generated by the power demanding side from the microcurrent supplied to the power demanding side and is supplied from the power demanding side to the electrical outlet or connector.

2. The user authentication electrical outlet or connector according to claim 1, wherein the electrical outlet or connector transmits an electrical outlet identification (ID) information to the power demanding side in response to an electrical outlet ID request signal.

3. The user authentication electrical outlet or connector according to claim 1, wherein the microcurrent flows no longer through the microcurrent limiting device when the power demanding device is disconnected from the user authentication electrical outlet or connector.

4. The user authentication electrical outlet or connector according to claim 1, wherein the authentication device determines whether or not an electrical outlet operation password received from the power demanding side corresponds to an electrical outlet identification (ID) information.

5. The user authentication electrical outlet or connector according to claim 1, wherein the maximum value of the microcurrent is tens of mA.

6. The user authentication electrical outlet or connector according to claim 1, wherein the electrical outlet or connector transmit an electrical outlet identification (ID) information to the power demanding side and provides an allowable current amount information of the electrical outlet or connector directly to the power demanding side through the electrical outlet ID information.

7. The user authentication electrical outlet or connector according to claim 1, wherein it is allowed the main power is supplied from the main power supply to the power demanding side by closing an electromagnetic switch, the electromagnetic switch is closed by receiving a DC power from the authentication power, and the closing of the electromagnetic switch is maintained by continuously using the DC power or by using a part of the main power which is AC power after the electromagnetic switch is closed.

8. A power mediation module through which a main power is supplied from a main power supply to a power demeaning device when the power demanding device is authenticated through a user authentication process, the power mediation module configured to:

receive a microcurrent from a user authentication electrical outlet or connector which is allowed to flow through a microcurrent limiting device of the electrical outlet or connector, wherein the microcurrent limiting device is a passive element and it is not until the power demanding device is connected to the electrical outlet or connector that a closed loop is formed for the microcurrent to flow through the microcurrent limiting device so that the microcurrent is supplied to the power mediation module; and generate an authentication power from the microcurrent supplied from the electrical outlet or connector and to provide the authentication power to the electrical outlet or connector for the user authentication press.

9. The power mediation module acceding to claim 8, wherein the power mediation module transmits an electrical outlet operation password corresponding to an electrical outlet identification (ID) information of the electrical outlet or connector to the electrical outlet or connector.

10. The power mediation module according to claim 8, wherein the power mediation module includes an AC/DC converter for converting the microcurrent into a direct current to generate the authentication power.

11. The power mediation module according to claim 8, wherein the power mediation module transmits a power amount information, caused by the power demanding device, to a mediation server at every unit time period.

12. The power mediation module according to claim 8, wherein the power mediation module receives an allowable current amount information of the user authentication electrical outlet or connector corresponding to an electrical outlet identification (ID) information of the user authentication electrical outlet or connector from a mediation server.

13. A power demanding device comprising the power mediation module according to claim 8.

14. A power demanding device configured to be connected to and charged by a user authentication electrical outlet or connector via the power mediation module according to claim 8.

* * * * *